(12) United States Patent
Bednarek et al.

(10) Patent No.: US 11,303,084 B2
(45) Date of Patent: Apr. 12, 2022

(54) DEVICE FOR SOLDERING AN ELECTRICAL CONDUCTOR WITH A CONNECTION DEVICE

(71) Applicant: Tyco Electronics France SAS, Pontoise (FR)

(72) Inventors: Alain Bednarek, Neuilly en Vexin (FR); Pascal Boilleau, Fremecourt (FR); Daniel Ferriez, Cergy (FR); Antoine Couffeau, Bray et Lu (FR); Pacal Albrieux, Goupillieres (FR)

(73) Assignee: Tyco Electronics France SAS, Pontoise (FR)

( * ) Notice: Subject to any disclaimer, the term of this patent is extended or adjusted under 35 U.S.C. 154(b) by 144 days.

(21) Appl. No.: 16/594,147

(22) Filed: Oct. 7, 2019

(65) Prior Publication Data

US 2020/0112135 A1 Apr. 9, 2020

(30) Foreign Application Priority Data

Oct. 5, 2018 (FR) ...................................... 1859248

(51) Int. Cl.
| | |
|---|---|
| *B23P 19/00* | (2006.01) |
| *H01R 43/048* | (2006.01) |
| *H01R 43/02* | (2006.01) |

(52) U.S. Cl.
CPC ....... *H01R 43/048* (2013.01); *H01R 43/0235* (2013.01); *Y10T 29/53261* (2015.01)

(58) Field of Classification Search
CPC ........ H01R 43/042; H01R 4/26; H01R 43/04; H01R 43/048; Y10T 29/53261; Y10T 29/53235; Y10T 29/5193; Y10T 29/53226; Y10T 29/53209; Y10T 29/49135; Y10T 29/53513; Y10T 29/53996; Y10T 29/49185; Y10T 29/53065
USPC ......... 29/759, 747, 748, 751, 753, 760, 857, 29/861, 874
See application file for complete search history.

(56) References Cited

U.S. PATENT DOCUMENTS

| | | | |
|---|---|---|---|
| 10,361,527 B2 * | 7/2019 | Schmidt | ............... H01R 43/058 |
| 10,971,878 B2 * | 4/2021 | Suzuki | ............... H01R 43/0207 |
| 2001/0020540 A1 | 9/2001 | Sakaguchi et al. | |
| 2015/0099406 A1 | 4/2015 | Tsuge | |
| 2015/0174691 A1 | 6/2015 | Ananthanarayanan | |

FOREIGN PATENT DOCUMENTS

| | | |
|---|---|---|
| EP | 2960991 A1 | 12/2015 |
| EP | 2996199 A1 | 3/2016 |
| JP | 09115558 A | 5/1997 |

(Continued)

OTHER PUBLICATIONS

Extended European Search Report, dated Apr. 28, 2020, 23 pages.
(Continued)

*Primary Examiner* — Thiem D Phan
(74) *Attorney, Agent, or Firm* — Barley Snyder

(57) ABSTRACT

A device for soldering an electrical conductor with a connection device includes a base plate having a passageway and an anvil mounted on the base plate and at least partially housed in the passageway. The anvil is electrically insulated from the base plate and positioned to allow an electrical current to pass through the electrical conductor and/or the connection device.

12 Claims, 6 Drawing Sheets

(56) References Cited

FOREIGN PATENT DOCUMENTS

JP          2017022065 A     1/2017
WO       2010026173 A1    3/2010

OTHER PUBLICATIONS

Partial European Search Report, App No. 19201149.2, dated Feb. 11, 2020, 17 pages.
English translation of JP2017022065A, dated Jan. 26, 2017, 6 pages.
English translation of JP09115558A, dated May 2, 1997, 6 pages.

* cited by examiner

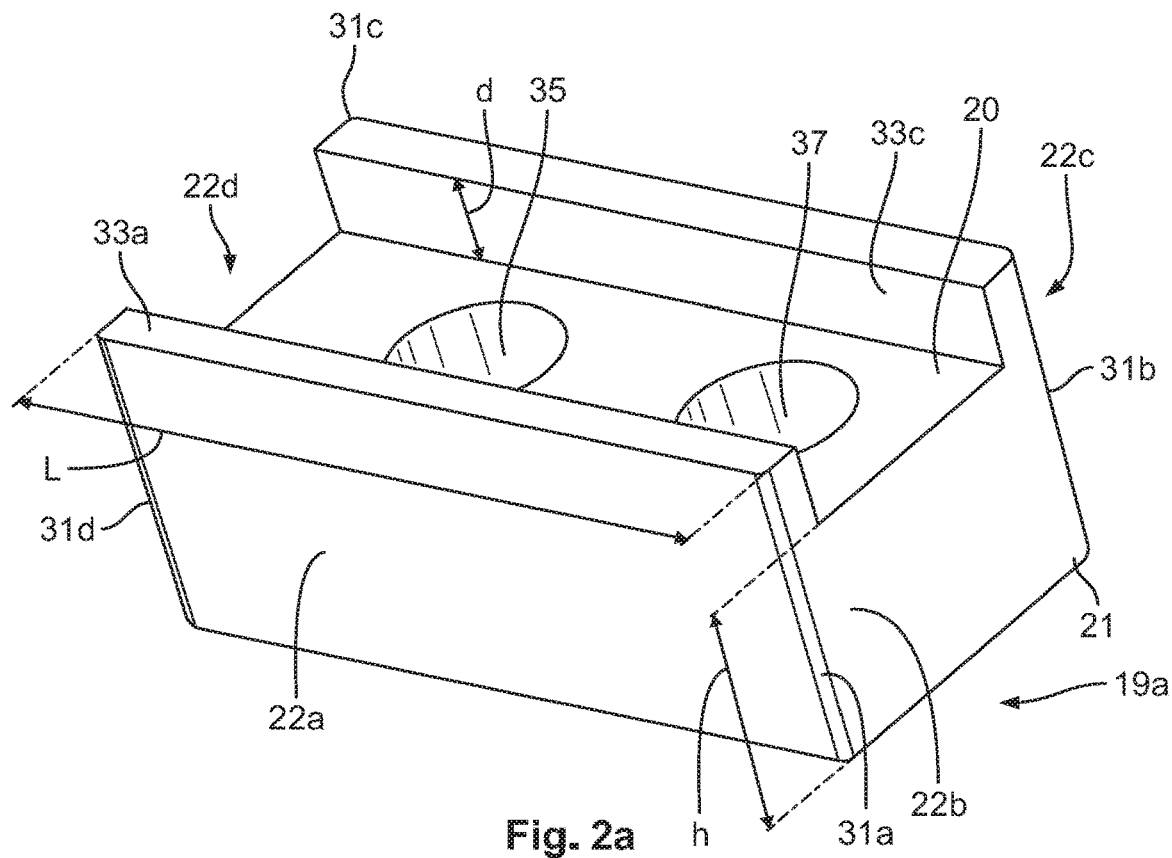
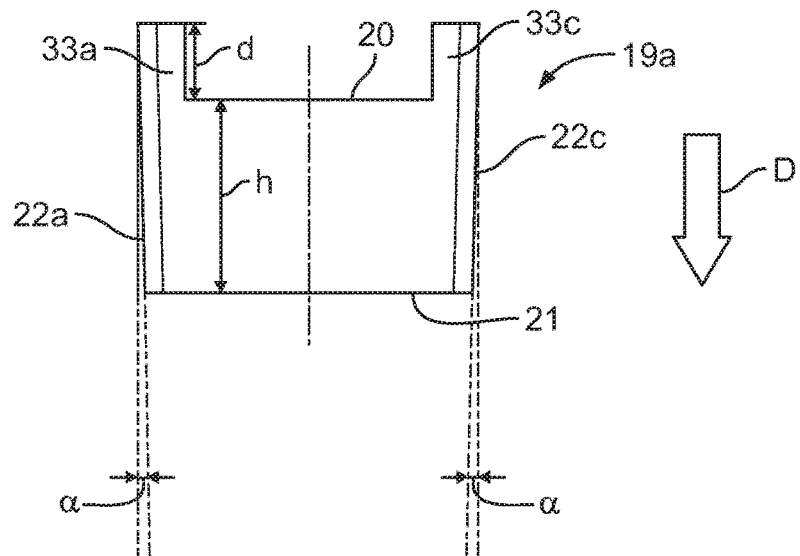
Fig. 2a
Fig. 2b

US 11,303,084 B2

DEVICE FOR SOLDERING AN ELECTRICAL CONDUCTOR WITH A CONNECTION DEVICE

CROSS-REFERENCE TO RELATED APPLICATION

This application claims the benefit of the filing date under 35 U.S.C. § 119(a)-(d) of French Patent Application No. 1859248, filed on Oct. 5, 2018.

FIELD OF THE INVENTION

The present invention relates to a device for soldering an electrical conductor and, more particularly, to a device for soldering an electrical conductor with a connection device.

BACKGROUND

A device is used for soldering and crimping an electrical conductor by plastically deforming a connection device around the electrical conductor. Such a device is described in European patent application EP 2996199 A1, and comprises at least one deformation unit, as well as an anvil with an electrical contact area towards the top of the anvil on which the electrical conductor and the connection device are intended to be placed. The anvil is capable of making an electrical current circulate through the electrical conductor and the connection device. Thus, the heat necessary to create the solder is generated by Joule effect at the junction of the electrical connector and the connection device towards the top of the anvil. The device makes it possible to obtain reliable and stable electrical connections, even when the electrical wires to be connected are small and/or made of aluminum or copper, or of copper and aluminum alloys.

The device, however, consumes significant electricity to reach a sufficiently high temperature to be able to perform the soldering. Indeed, such a device is usually supplied by a current generator with an electrical current in the range of 500 amps to 750 amps for an applied voltage in the range of 1 to 2 volts for some hundreds of milliseconds. However, in certain situations, leakages of electrical currents and/or electrical arcs from the anvil with other conductive elements have been observed, and are usually linked to the deterioration of the anvil's insulation, specifically in locations in which the anvil is subjected to mechanical stress.

These electrical leakages, in particular, prevent the heating by Joule effect from being limited to the contact area on which the electrical conductor and the connection device are placed, which increases the device's electrical energy requirements for allowing the contact area of the anvil to reach the temperature necessary for performing the soldering, correspondingly reducing the lifespan of the anvil. Furthermore, the position of the anvil on the base plate may deviate from its initial fixing position over the duration of the use of the device, which may create involuntary electrical contacts of the anvil with other parts of the base plate.

SUMMARY

A device for soldering an electrical conductor with a connection device includes a base plate having a passageway and an anvil mounted on the base plate and at least partially housed in the passageway. The anvil is electrically insulated from the base plate and positioned to allow an electrical current to pass through the electrical conductor and/or the connection device.

BRIEF DESCRIPTION OF THE DRAWINGS

The invention will now be described by way of example with reference to the accompanying Figures, of which:

FIG. 2A is a perspective view of a first portion of an anvil of the device of FIG. 1;

FIG. 2B is an end view of the first portion of FIG. 2A:

DETAILED DESCRIPTION OF THE EMBODIMENT(S)

The invention will now be described in greater detail using embodiments in an exemplary manner and with reference to the drawings. The embodiments described are simply possible configurations and it should be borne in mind that the individual characteristics as described may be provided independently of each other or may be omitted altogether when implementing the present invention.

Figure 1A:
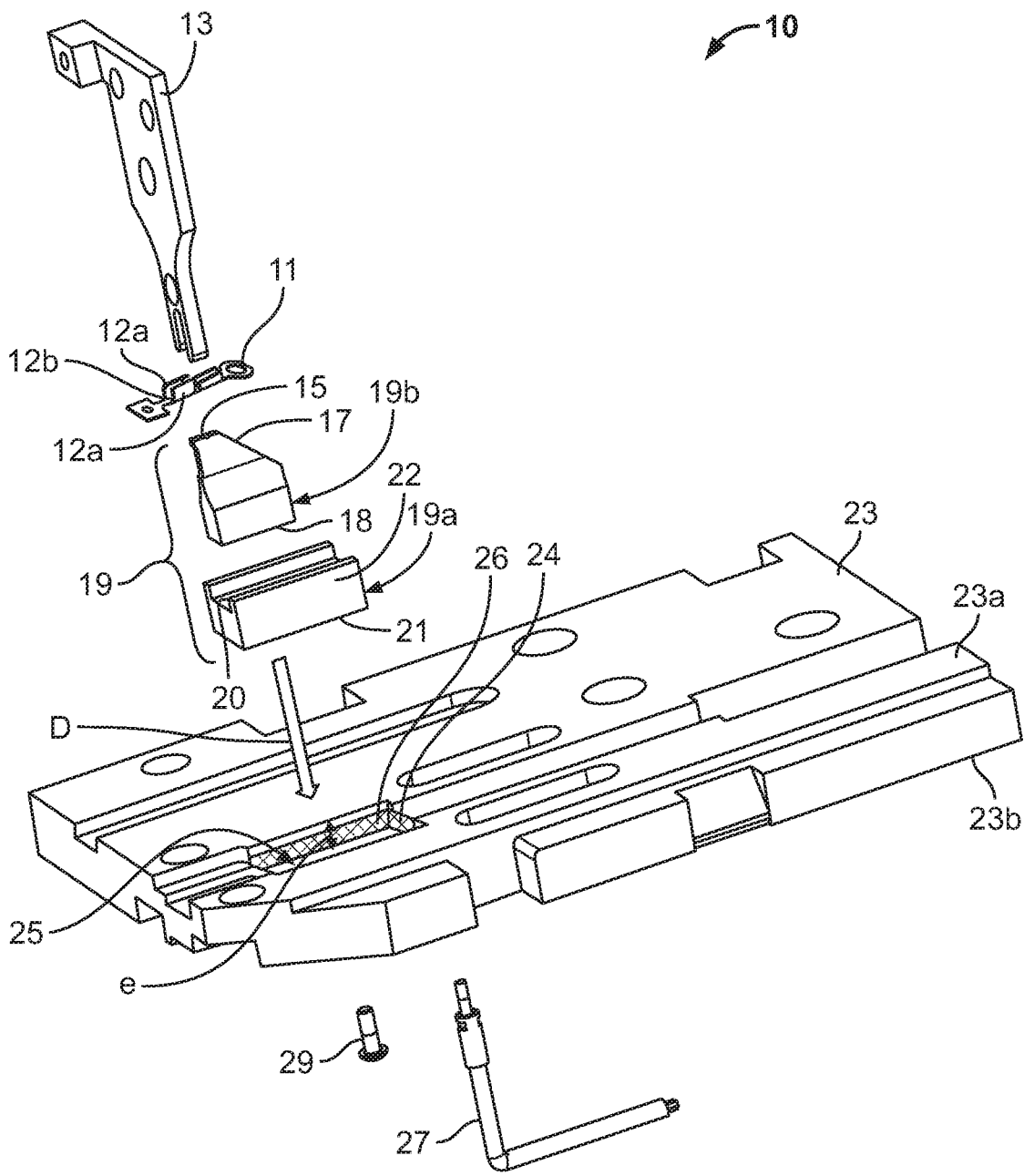
FIG. 1A is an exploded perspective view of a device for soldering an electrical conductor with a connection device according to an embodiment.
Figure 1B:
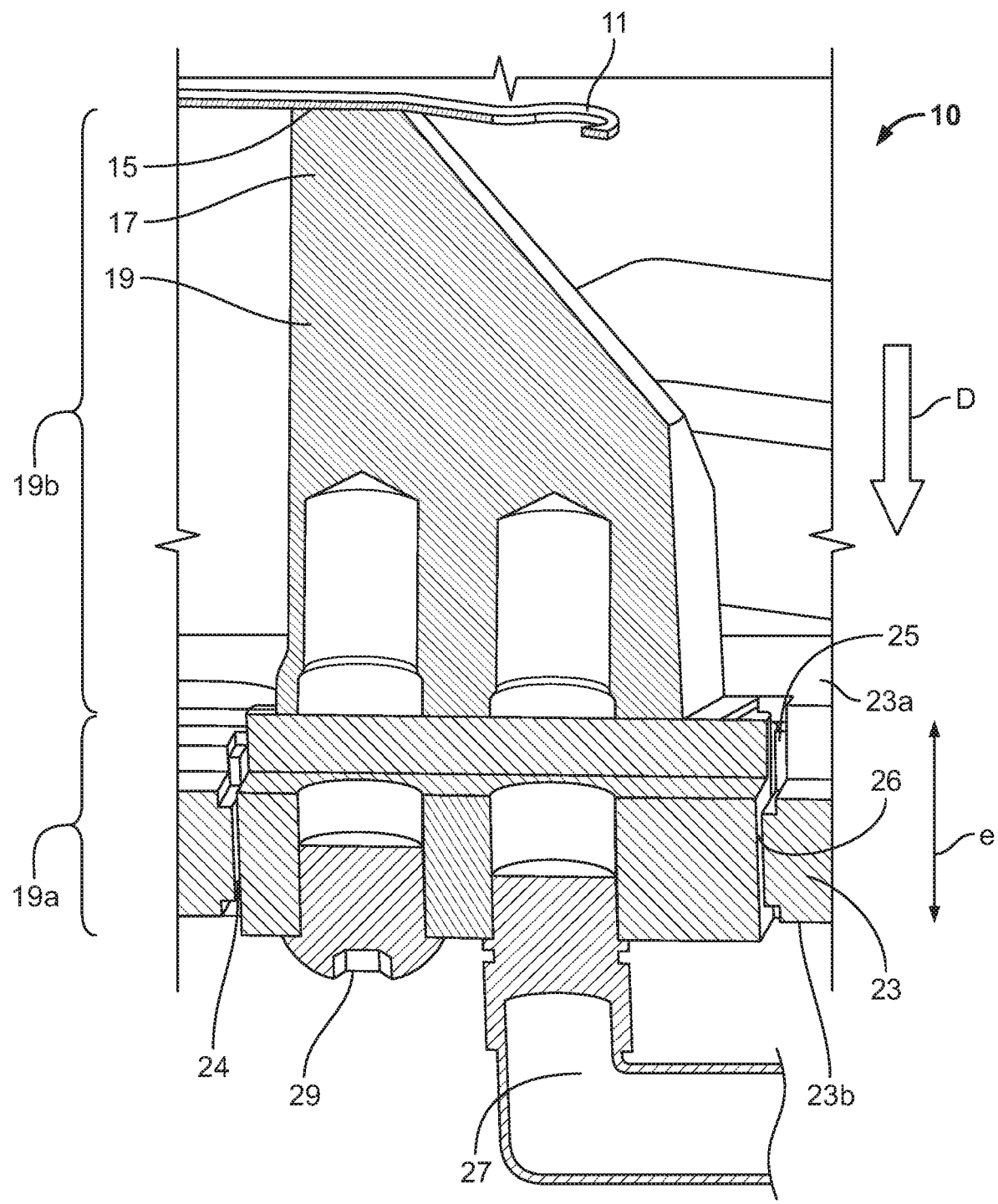
FIG. 1B is a sectional perspective view of the device of FIG. 1.

A device 10 for soldering an electrical conductor with a connection device 11 according to an embodiment is shown in FIGS. 1A and 1B.

The connection device 11, as shown in FIG. 1A, has a pair of wings 12a which extend on either side of a crimping shaft 12b. The electrical conductor is received in the crimping shaft 12b of the connection device 11. The wings 12a of the connection device 11 are deformed by a movable deformation unit 13 of the device 10, so as to surround the electrical conductor housed in the crimping shaft 12b. Moreover, the wings 12a of the connection device 11 are soldered together in order to ensure the electrical contact between the electrical conductor and the connection device 11. The soldering is carried out at a contact area 15 at a top 17 of an anvil 19. The anvil 19 is conductive in order to make an electrical current circulate through the electrical conductor and the connection device 11 during use of the device 10.

The anvil 19 is made of a steel capable of withstanding a high temperature, such as a steel which has been subjected to a heat treatment, such that a temperature in the order of 280° C. (degrees Celsius) can be obtained in the electrical connector to be soldered onto the connection device 11. In particular, the anvil 19 may be made of a steel of the W360 SPF 57 HRC type, which is capable of withstanding temperatures of around 600° C.

The anvil 19, as shown in FIGS. 1A and 1B, has a first portion 19a and a second portion 19b. The first portion 19a has a first base 21 of the anvil 19 and the second portion 19b has the top 17 of the anvil 19. In the shown embodiment, the first portion 19a has a prism shape with a pair of first bases 20, 21 and lateral walls 22.

In the embodiment shown in FIGS. 1A and 1B, the first portion 19a and the second portion 19b are two distinct portions suitable for being joined onto each other by a fixing device, which will be further described below. Thus, one of the two portions 19a, 19b of the anvil 19 may be replaced, in the event of deterioration for example, without having to change the anvil 19 in its entirety. When the anvil 19 is assembled, the first base 20 of the first portion 19a is in contact with a second base 18 of the second portion 19b. In another embodiment, the anvil 19 is formed integrally so as to constitute a single piece in which the first portion 19a and the second portion 19b are therefore not two pieces which are distinct from each other.

The first base 21 of the first portion 19a of the anvil 19 is fixed onto a base plate 23, as shown in FIG. 1A. The base plate 23 is made of steel, in particular of steel which has undergone a heat treatment. The base plate 23 has a first surface 23a and a second surface 23b opposite the first surface 23a. The base plate 23 has a passageway 25 in the thickness of the plate 23 so as to open out on either side of the surfaces 23a, 23b of the base plate 23. At the passageway 25, the base plate 23 has a thickness e between the first surface 23a and the second surface 23b. The passageway 25 thus has a thickness, i.e. a depth, e of at least 5 millimeters. In an embodiment, the thickness e of the passageway 25 is 7 millimeters.

The passageway 25 has a shape which is complementary to that of the first portion 19a of the anvil 19. Thus, the first portion 19a of the anvil 19, as shown in FIGS. 1A and 1B, is configured to be housed in the passageway 25 of the base plate in a direction of insertion D corresponding to the insertion of the first base 21 of the anvil 19 into the base plate 23 by the first surface 23a.

In order to retain the first portion 19a of the anvil 19 in the passageway 25, as shown in FIGS. 1A and 1B, the walls 26 of the passageway 25 are covered with electrically insulating glue 24. In an embodiment, the glue 24 is thixotropic epoxy glue. Consequently, the first portion 19a of the anvil 19 is housed and glued to the walls 26 of the passageway 25 of the base plate 23.

To further electrically insulate the base plate 23, the first portion 19a of the anvil 19 has the lateral walls 22 covered with an insulating coating, for example, a ceramic coating of 250 micrometers thickness by plasma projection deposition. The first bases 20 and 21 of the first portion 19a are not covered with an insulating coating in order to allow an electrical current to pass through the bases 20 and 21 of the first portion 19a.

With the exception of the contact area 15 and the second base 18 of the second portion 19b in contact with the first base 20 of the first portion 19a, the second portion 19b is covered with a coating by physical vapor deposition (PVD) of 12 micrometers which is capable of withstanding at least 1000° C. in order to guarantee a continuous hold of 600° C. corresponding to the temperature at the contact area 15 during use of the device 10. The first portion 19a is subjected, during use of the device 10, to a temperature not usually exceeding 80° C., because the first portion 19a is not located at the contact area 15. The first portion 19a and the insulating glue 24 are nevertheless capable of withstanding a temperature of up to 230° C.

The deformation unit 13 may also be partially electrically insulated by a coating by physical vapor deposition identical to that deposited on the second portion 19b, leaving only the area of the deformation unit 13 which is configured to deform the wings 12a of the connection device 11, which is electrically conductive. The deformation unit 13 shall be described in greater detail below with reference to FIGS. 6 and 7.

The lateral walls 22 of the anvil 19 are thus electrically insulated from the lateral walls 26 of the passageway 25, which they face by a layer of insulating glue 24 and by their insulating coating. Thus, the risk of a leakage of electrical current between the electrical current circulating in the anvil 19 and the plate 23 may be avoided, even if areas of the insulating coating of the lateral walls 22 of the anvil 19 are damaged, following deterioration for example or by abrasion, by virtue of the layer of insulating glue 24.

The anvil 19 is connected electrically to a current generator by an electrical supply cable 27, shown in FIGS. 1A and 1B, screwed into the first portion 19a and into the second portion 19b of the anvil 19. Thus, the electrical supply cable 27 also makes it possible to fix the assembly of the first portion 19a and the second portion 19b. Moreover, a fixing screw 29 likewise makes it possible to retain the assembly of the anvil 19 by passing through the first portion 19a and the second portion 19b.

To assemble the device 10 to the assembled state shown in FIG. 1B, the walls 26 of the passageway 25 are covered with electrically insulating glue 24. The first portion 19a is then inserted in the direction of insertion D into the passageway 25, which will potentially cause an excess of glue to overflow on either side of the passageway 25 at the first surface 23a and at the second surface 23b of the plate 23.

Figure 3A:
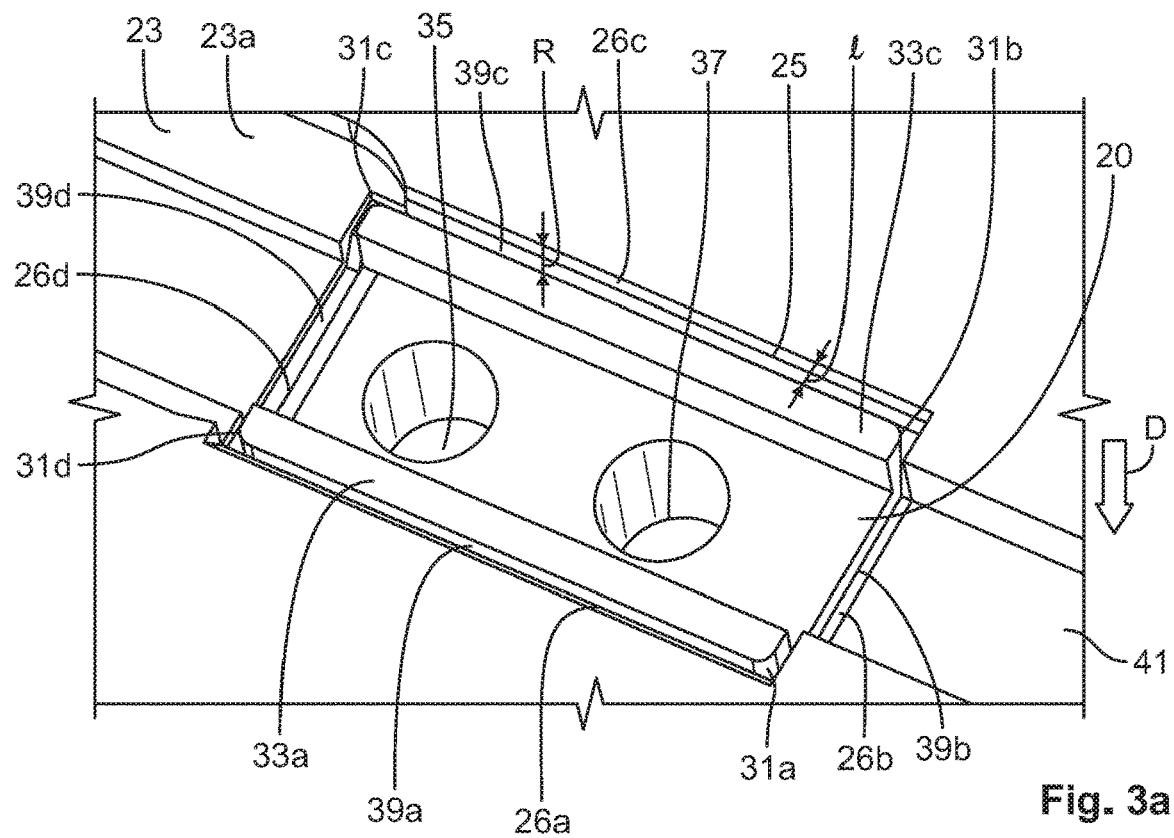
FIG. 3A is a perspective view of a first surface of a base plate and the first portion of the anvil of the device of FIG. 1.

The surplus of glue then fills the gluing grooves 39a-39d on one side 23a and the other side 23b of the base plate 23, shown in FIG. 3A. The surplus of glue is envisaged in a sufficient quantity to guarantee the filling of the gluing grooves 39a-39d of the passageway 25 with shoulders 39a-39d. The base plate 23 is then placed in the heat chamber, in particular at 120 degrees Celsius for 30 minutes, in order to harden the glue 24. Once the glue 24 has hardened, the potential excess of glue 24 which overflows onto the surfaces 23a, 23b of the plate is removed by sanding. In one variant, the excess of glue 24 could be removed by another technical methods. The second portion 19b of the anvil 19 is then joined to the first portion 19a by the fixing screw 19 and the electrical supply cable 27, which are introduced via the second surface 23b of the surface 23 and which penetrate as far as into the second portion 19b by passing through the plate 23 and the first portion 19a. In another embodiment, the first portion 19a could be joined to the second portion 19b by a device other than fixing screws 29, for example by a bayonet system or a cam system for fast clamping.

The first portion 19a is shown in FIGS. 2A and 2B. The first portion 19a of the anvil 19 has a prism shape, the first bases 20, 21 of which are rectangular. The first base 20 of the first portion 19a corresponds to the surface intended to be in contact with the second portion 19b when the anvil 19 is assembled. The first base 21 corresponds to the base of the anvil 19. Because the bases 20, 21 are rectangular, the first portion 19a has four lateral walls 22a, 22b, 22c, 22d. The edges 31a, 31b, 31c, 31d at the junction of each lateral wall 22a-d are rounded or chamfered, in particular with a radius of curvature of 0.5 millimeters. Thus, in addition to avoiding sharp edges which could prove to be cutting, the chamfer of the lateral edges 31a-d of the first portion 19a makes it possible to provide more space for the insulating glue 24 to fill between the first portion 19a and the lateral walls 26 of the passageway 25. As a consequence, the increase in thickness of the layer of insulating glue 24 between the first portion 19a and the passageway 25 of the plate 23 makes it possible to further improve the electrical insulation of the anvil 19 with the base plate 23.

The shape of the first portion 19a of the anvil 19 is not limited to a prism shape. As a consequence, the shape of the passageway 25 in the base plate 23, which has a shape which is complementary to that of the first portion of the anvil 19a, is not limited to a prism shape. The person skilled in the art may adapt the geometry of the first portion 19a and of the passageway 25 to shapes other than the prism shape, for example to a cylindrical shape.

Lateral faces 22a, 22c, of greater length L, of the first portion 19a extend in the direction of their height h by a distance d beyond the base 20, as shown in FIGS. 2A and 2B. The base 20 is thus lined by two walls 33a, 33c. These walls 33a, 33c make it possible, amongst other things, to ensure the positioning of the second portion 19b during the assembly of the anvil 19. The walls 33a, 33c are also adapted to the dimensions of a groove in the base plate 23 which will be described further with regard to FIG. 3A.

As shown in FIG. 2B, the lateral walls 22a and 22c are beveled or tapered so as to be inclined by an angle α, in particular α=1.3°. Thus, the lateral walls 22a and 22c are convergent in the direction of the height h in the direction of the base 20 towards the base 21. Likewise, the walls 26 of the passageway 25 are inclined in the direction of insertion D, in particular by an angle α=1.3°. The incline of the lateral walls 22a and 22c of the first portion 19a and of the walls 26 of the passageway 25 therefore make it possible to bring about a form-fit between the anvil 19 and the passageway 25 of the plate 23, such as a Morse cone type connection. This form-fit makes it possible to avoid the anvil 19 passing through the passageway 25 during insertion in the direction D, in particular when the glue 24 deposited on the walls 26 of the passageway 25 is still in the liquid or paste state, and above all during use of the device for soldering 10 under the stress of soldering and/or crimping during the crimping. Moreover, the Morse cone type connection permitted by the incline of the walls 22a, 22c, 26 makes it possible to guarantee self-centering of the part 19a in the passageway 25 of the base plate 23 during the insertion of the part 19a in the direction D.

In other embodiments, the first part 19a of the anvil 19 could have other shapes, as long as the shape of the first part of the anvil 19a allows a form-fit with the passageway 25 to avoid the anvil 19 passing through the passageway 25 in the direction of insertion D.

The first portion 19a, as shown in FIG. 2A, has a pair of holes 35, 37 in the direction of insertion D, in which the electrical supply cable 27 and the fixing screw 29 are housed in order to make it possible to fix the first part 19a to the second part 19b of the anvil 19.

Figure 3B:
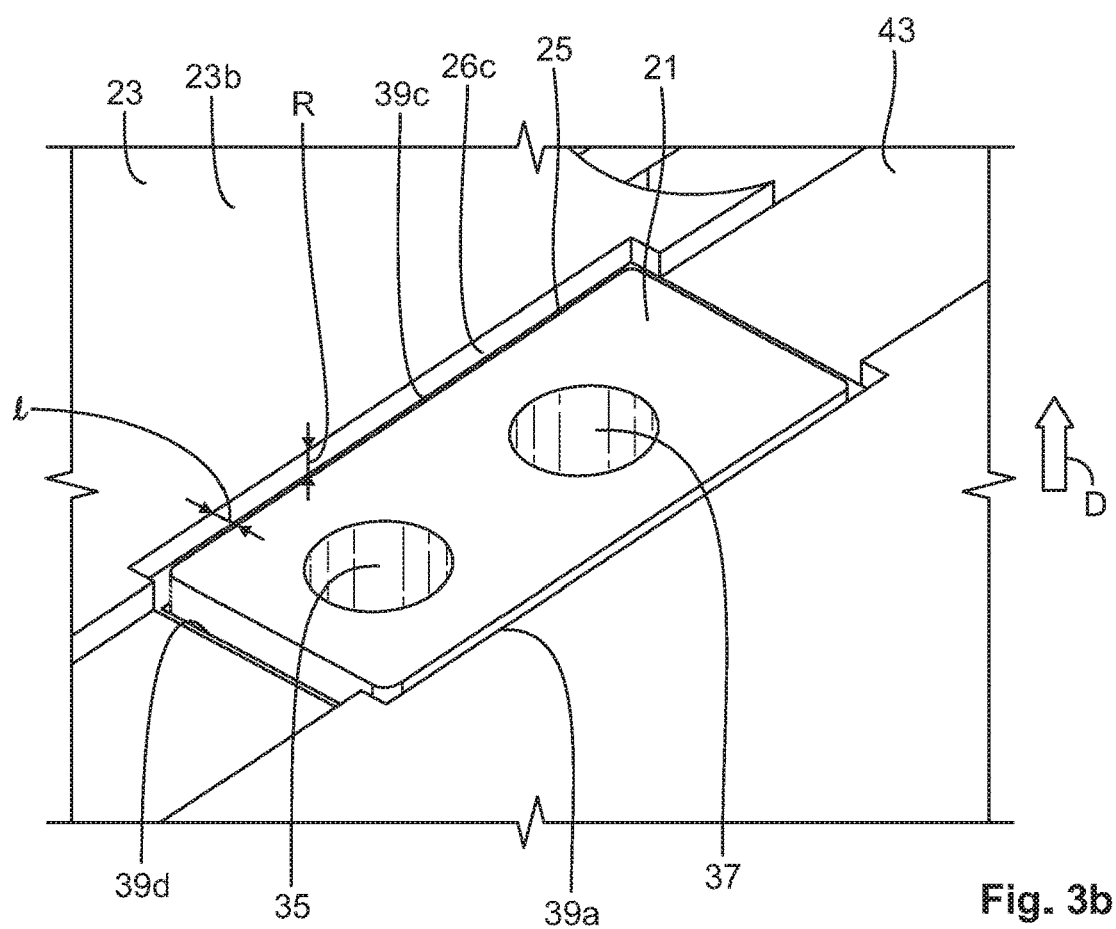
FIG. 3B is a perspective view of a second surface of the base plate and the first portion of the anvil of FIG. 3A.

The first surface 23a and the second surface 23b of the base plate 23 are shown in FIGS. 3A and 3B. The first portion 19a is introduced in the direction of insertion D into the passageway 25 of the base plate 13 and is glued, by the electrically insulating glue 24, to the plate 23, then the second portion 19b is joined to the first portion 19a. FIGS. 3A and 3B depict the step in which the first portion 19a is housed in the passageway 25 but in which the second portion 19b has not yet been joined to the first portion 19a.

In another embodiment, the first portion 19a could be joined to the second portion 19b in order to form the anvil 19, then the anvil 19 could be fixed in the passageway 25 of the base plate 23. This variant will be described further with regard to the second embodiment shown in FIG. 4 in relation to an integrally formed anvil.

The passageway 25 of the base plate 23 is a hole with shoulders, such that the lateral walls 26a, 26b, 26c, 26d of the hole 25 comprise shoulders 39a, 39b, 39c, 39d at the first surface 23a and at the second surface 23b of the plate 23, as shown in FIGS. 3A and 3B. These shoulders 39a-d form, with the walls 22a-22d of the first portion 19a of the anvil 19, gluing grooves 39a-39d in which the electrically insulating glue 24 is arranged. These gluing grooves 39a-39d, which are in particular at least 0.3 millimeters in width 1, make it possible to uniformly increase the thickness of the layer of insulating glue 24, which contributes to reducing the risk of loss of electrical current from the anvil 19 to the base plate 23.

The height h of the first portion 19a is smaller than the depth of the passageway 25. Thus, the first portion 19a of the anvil 19 may be positioned in the hole 25 without the first portion 19a protruding from the passageway 25 either at the first surface 23a or at the second surface 23b of the plate 23. This positioning shown in FIGS. 3A and 3B, with an indent from the first portion 19a of height R parallel to the direction of insertion D, of each surface 23a, 23b of the plate 23 makes it possible to minimize a risk of leakage of current or of electrical arc from the first portion 19a to the plate 23. In an embodiment, the height R of the indent between each base 20, 21 of the first portion 19a and each surface 23a, 23b of the plate 23 is at least 0.3 millimeters.

The base plate 23 has on each surface 23a, 23b a groove 41, 43 which extends on either side of the passageway 25 along the length of the passageway 25, as shown in FIGS. 3A and 3B. These grooves 41, 43 make it possible, in particular, to assist in the mounting and disassembly of the anvil 19. The groove 23 makes it possible to be able to adjust, if necessary, the height h of the base 20 of the first portion 19a after it is glued onto the plate 23. As shown in FIG. 3A, the walls 33a, 33c at the base 20 of the first portion 19a are longitudinally aligned with the groove 41 of the first surface 23a of the plate 23.

The first embodiment thus makes it possible to reduce the risk of electrical leakage or electrical arc between the electrical current circulating in the anvil 19 and the base plate 23 by virtue of the electrical insulation provided by the insulating glue 24 and the insulating coating of the anvil 19. The improvement in the electrical insulation of the anvil 19 thus makes it possible to concentrate more diffused heat by Joule effect at the contact area 15 of the top 17 of the anvil 19 where the soldering is carried out.

Figure 4:
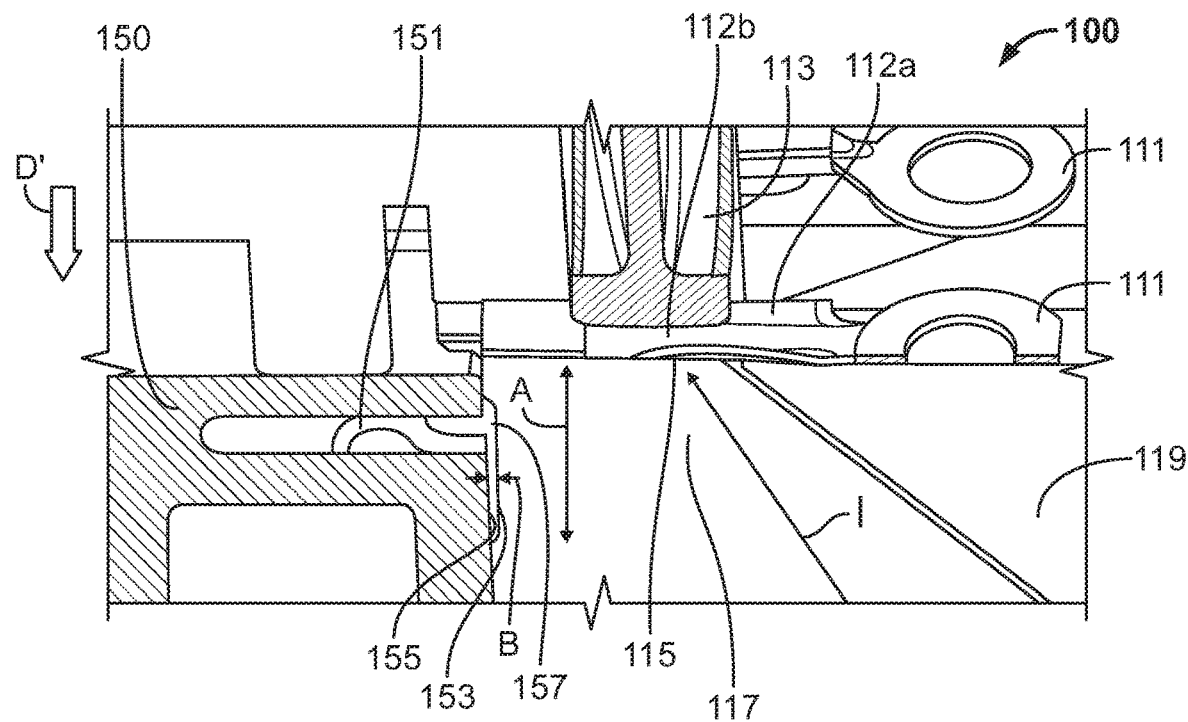
FIG. 4 is a sectional perspective view of a device for soldering according to another embodiment.

A device 100 for soldering an electrical conductor with a connection device 111 according to another embodiment is shown in FIG. 4. FIG. 4 partially depicts an anvil 119 face-to-face with a cutting unit, in this case a cutting carrier strip 150. The cutting carrier strip 150 makes it possible to cut a portion 151 of an electrical conductor intended to be soldered to a connection device 111.

The connection device 111, as shown in FIG. 4, has a pair of wings 112a which extend on either side of a crimping shaft 112b. The electrical conductor is received in the crimping shaft 112b of the connection device 111. The wings 112a of the connection device 111 are deformed by a movable deformation unit 113 of the device 100, so as to surround the electrical conductor housed in the crimping shaft 112b. Moreover, the wings 112a of the connection device 111 are soldered together in order to ensure the electrical contact between the electrical conductor and the connection device 111. The soldering is carried out at a contact area 115 provided at a top 117 of an anvil 119. The anvil 119 is conductive in order to make an electrical current I circulate through the electrical conductor and the connection device 111 during use of the device 110.

The anvil 119 is made of a steel capable of withstanding a high temperature, in particular of steel which has been subjected to a heat treatment, such that a temperature in the order of 280° C. (degrees Celsius) can be obtained in the electrical connector to be soldered onto the connection device 111. In an embodiment, the anvil 119 may be made of a steel of the W360 SPF 57 HRC type, which is capable of withstanding temperatures of around 600° C. The anvil 119 is covered with an insulating coating, a ceramic coating of 12 micrometers thickness deposited by plasma projection, for example, except at the contact area 115 to allow soldering.

A wall 153 of the anvil 119 is face-to-face with a wall 155 of the cutting carrier strip 150, as shown in FIG. 4. In practice, at the wall 153, the insulating coating of the anvil 119 is likely to deteriorate following repeated use of the device 100 for example, causing a risk of electrical leakage or electrical arc from the areas of deterioration of the insulating coating of the anvil 119, in particular to the cut portion 151 of the electrical conductor. This risk is moreover increased on the wall 153 at the top 117 of the anvil 119, in particular over a distance A of 2.5 millimeters, which extends in the anvil 119 from the contact area 115 in the direction of displacement D' of the cutting unit 150. The distance A corresponds to the length over which the cutting carrier strip 150 slides in the direction D' with the cut portion 151 of the electrical conductor. Any cutting edges of the cut portion 151 are then likely to damage the insulation of the anvil 119, particularly along the distance A of the wall 153 of the anvil 119.

In order to reduce the risk of electrical leakage from the wall 153 at the top 117 of the anvil 119, the anvil 119 of the device 100 according to the embodiment shown in FIG. 4 is partially distanced from the cutting carrier strip 150, in order to electrically insulate them from each other. The anvil 119 is distanced from the cutting carrier strip 150 by a recess 157 in the wall 153 of the anvil 119 produced along the distance A and depth B such that B≥0.3 millimeters. As a consequence, the anvil 119 and the cutting carrier strip 150 are face-to-face such that their respective walls 153, 155 are at least spaced apart at the top 117 of the anvil 119 by the recess 157 in the anvil 119. The recess 157 is thus produced along the distance A over which the cutting carrier strip 150 slides the part of the cut electrical conductor 151, which makes it possible to improve the durability of the insulating coating of the anvil 119 by reducing the mechanical stress at that location.

Moreover, the volume of air filling the recess 157, shown in FIG. 4, makes it possible to ensure the electrical insulation between the anvil 119 and the cutting carrier strip 150. The electrical insulation may thus be produced by the volume of air filling the recess 157 of the anvil 119 but also, in an embodiment, by an insulating material covering or filling the recess. In particular, the filling of the recess 157 by an insulating material makes it possible to further improve the electrical insulation between the top 117 of the anvil 119 and the cutting carrier strip 150.

The recess 157 may be any shape. In other embodiments, there may also be several recesses 157 of equal and/or different size and shape. In another embodiment, the wall 155 of the cutting carrier strip 150 could have one or more recesses in order to create an air space or a space filled with insulation, in particular instead of the recess 157. In one variant, the respective walls 153, 155 of the anvil 119 and of the cutting carrier strip 150 are each equipped with at least one recess 157 each.

The second embodiment shown in FIG. 4 thus makes it possible to prevent abrasion between the top 117 of the anvil 119 and the cutting unit 150 and the cut portion 151 of the connection device 111 at the potentially cutting edges. The risk of deterioration, by friction, of the coating of the anvil 119 at its top 117 is thus reduced. The reduction in the risk of deterioration of the anvil 119 makes it possible to consecutively reduce the risk of leakages or electrical arcs of the electrical current I circulating in the anvil 119. The improvement in the electrical insulation of the anvil 119 therefore makes it possible to concentrate more diffused heat by Joule effect at the contact area 115 of the top 117 of the anvil 119 where the soldering is carried out.

Figure 5:
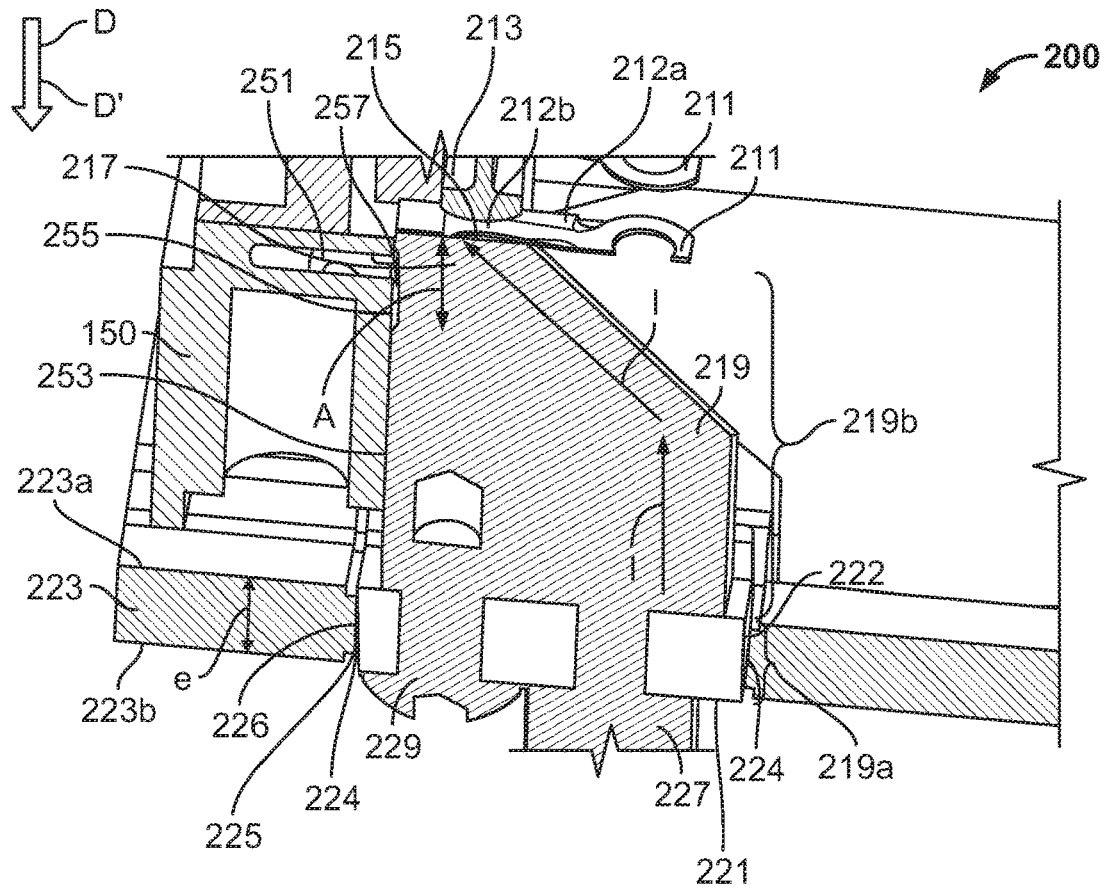
FIG. 5 is a sectional perspective view of a device for soldering according to another embodiment.

A device 200 for soldering an electrical conductor with a connection device 211 according to another embodiment is shown in FIG. 5.

The connection device 211, as shown in FIG. 5, has a pair of wings 212a which extend on either side of a crimping shaft 212b. The electrical conductor is received in the crimping shaft 212b of the connection device 211. The wings 212a of the connection device 211 are deformed by a movable deformation unit 213 of the device 200, so as to surround the electrical conductor housed in the crimping shaft 212b. Moreover, the wings 212a of the connection device 211 are soldered together in order to ensure the electrical contact between the electrical conductor and the connection device 211. The soldering is carried out at a contact area 215 at a top 217 of an anvil 219. The anvil 219 is conductive in order to make an electrical current I circulate through the electrical conductor and the connection device 211 during use of the device 200.

The anvil 219 is covered with an insulating coating, a ceramic coating of 12 micrometers thickness deposited by physical vapor deposition, in an embodiment, except at a base 221 of the anvil 219 and at the contact area 215 to allow the electrical current to circulate towards the soldering area.

The anvil 219, in contrast to the first embodiment, is integrally formed as a single piece. The anvil 219, as shown in FIG. 5, has a first portion 219a and a second portion 219b. The first portion 219a has the base 221 of the anvil 219 and the second portion 229b has the top 217 of the anvil 219.

The base 221 of the first portion 219a of the anvil 219 is fixed onto a base plate 223, as shown in FIG. 5. The base plate 223 has a first surface 223a and a second surface 223b opposite the first surface 223a. The base plate 223 has a passageway 225 in the thickness of the plate 223 so as to open out on either side of the surfaces 223a, 223b of the base plate 223. At the passageway 225, the base plate 223 has a thickness e between the first surface 223a and the second surface 223b. The passageway 225 thus has a thickness, i.e. a depth, e of at least 5 millimeters. In an embodiment, the thickness e of the passageway 225 is 7 millimeters.

The passageway 225 has a shape which is complementary to that of the first portion 219a of the anvil 219. The first portion 219a of the anvil 219 is housed in the passageway 225 of the base plate 223 in a direction of insertion D corresponding to the insertion of the base 221 of the anvil 219 into the plate 223 at the first surface 223a.

In order to retain the first portion 219a of the anvil 219 in the passageway 225, the walls 226 of the passageway 225 are covered with electrically insulating glue 224, as shown in FIG. 5. In an embodiment, the glue 224 is a thixotropic epoxy glue. As a consequence, the first portion 219a of the anvil 219 is housed and glued to the walls 226 of the passageway 225 of the base plate 223.

The anvil 219 is connected electrically to a current generator by an electrical supply cable 227 screwed into the first portion 219a and into the second portion 219b of the anvil 219, as shown in FIG. 5. A fixing screw 229 likewise makes it possible to retain the assembly of the anvil 219 on the plate 223.

The anvil 219 is electrically insulated from the lateral walls 226 of the passageway 225 via a layer of insulating glue 224 and via their insulating coating. Thus, the risk of a leakage of electrical current between the electrical current circulating in the anvil 219 towards the plate 223 may be avoided, even if areas of the insulating coating of the lateral walls 226 of the anvil 219 are damaged, following deterioration for example, by virtue of the layer of insulating glue 224.

The first portion 229a, as shown in FIG. 5, has lateral walls 222 inclined relative to the walls 226 of the passageway 225, such that there is a form-fit between the anvil 219 and the base plate 223 during insertion of the anvil 219 into the passageway 225 in the direction of insertion D. This form-fit makes it possible to avoid the anvil 219 passing through the passageway 225 during insertion in the direction D, in particular when the glue 224 deposited on the walls 226 of the passageway 225 is still in the liquid or paste state.

The anvil 229, as shown in FIG. 5, is face-to-face with a cutting unit, in this case a cutting carrier strip 250. The cutting carrier strip 250 makes it possible to cut a portion 251 of an electrical conductor intended to be soldered to a connection device 211. A wall 253 of the anvil 219 is face-to-face with a wall 255 of the cutting carrier strip 250. In practice, at the wall 253, the insulating coating of the anvil 219 is likely to deteriorate following repeated use of the device 200 for example, causing a risk of electrical leakage or electrical arc, from the areas of deterioration of the insulating coating of the anvil 219, in particular towards the cut portion 251 of the electrical conductor. This risk is moreover increased on the wall 253 at the top 217 of the anvil 219, in particular over a distance A of 2.5 millimeters, which extends in the anvil 219 from the contact area 215 in the direction of displacement D' of the cutting unit 250. Indeed, this distance A corresponds to the length over which the cutting carrier strip 250 slides in the direction D' with the cut portion 251 of the electrical conductor. Any cutting edges of the cut portion 251 are then likely to damage the insulation of the anvil 219, particularly along the distance A of the wall 253 of the anvil 219.

In order to reduce the risk of electrical leakage from the wall 253 at the top 217 of the anvil 219, the anvil 219 of the device 200 is partially distanced from the cutting carrier strip 250, in order to electrically insulate them from each other. The anvil 219 is distanced from the cutting carrier strip 250 by a recess 257 in the wall 253 of the anvil 219 produced along the distance A and depth B such that B≥0.3 millimeters. As a consequence, the anvil 219 and the cutting carrier strip 250 are face-to-face such that their respective walls 253, 255 are in contact from the surface 223a of the base plate 223 and are spaced apart at the top 217 of the anvil 219 by the recess 257 in the anvil 219. The recess 257 is produced along the distance A over which the cutting carrier strip 250 slides the part of the cut electrical conductor 251, which makes it possible to improve the durability of the insulating coating of the anvil 219 by reducing the mechanical stress at that location.

As shown in FIG. 5, the volume of air filling the recess 257 makes it possible to ensure the electrical insulation between the anvil 219 and the cutting carrier strip 250. The electrical insulation may thus be produced by the volume of air filling the recess 257 of the anvil 219 but also, in an embodiment, by an insulating material covering or filling the recess 257. The filling of the recess 257 with an insulating material makes it possible to further improve the electrical insulation between the top 217 of the anvil 219 and the cutting carrier strip 250.

The recess 257 may be any shape. In other embodiments, there may also be several recesses 257 of equal and/or different size and shape. In another embodiment, the wall 255 of the cutting carrier strip 250 could have one or more recesses 257 in order to create an air space or a space filled with insulation, instead of the recess 257. In an embodiment, the respective walls 253, 255 of the anvil 219 and of the cutting carrier strip 150 are each equipped with at least one recess 257 each.

The third embodiment shown in FIG. 5 thus makes it possible to combine an improvement in the insulation of the anvil 229 at the base plate 223 as well as at the top of the anvil 227. As a consequence, by reducing electrical leaks, the heat may be concentrated more on the contact area on which the electrical conductor and the connection device 211 are intended to be soldered, which improves the operation and effectiveness of the device 200 for soldering.

Figure 6:
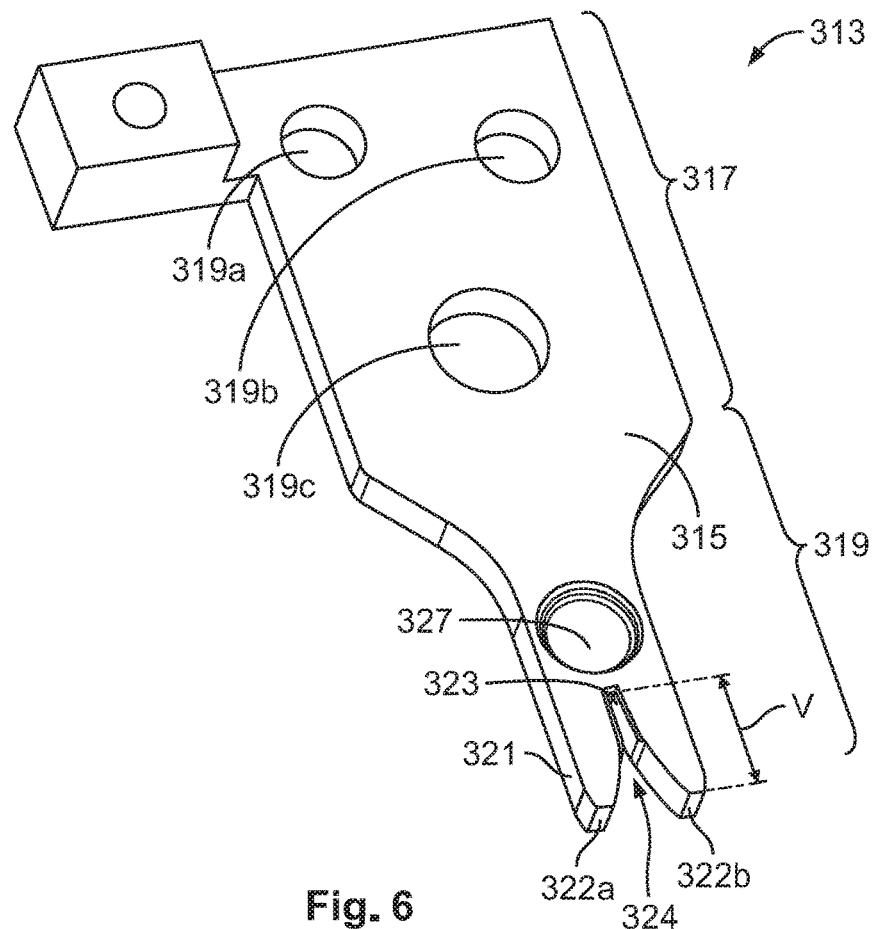
FIG. 6 is a perspective view of a deformation unit.
Figure 7:
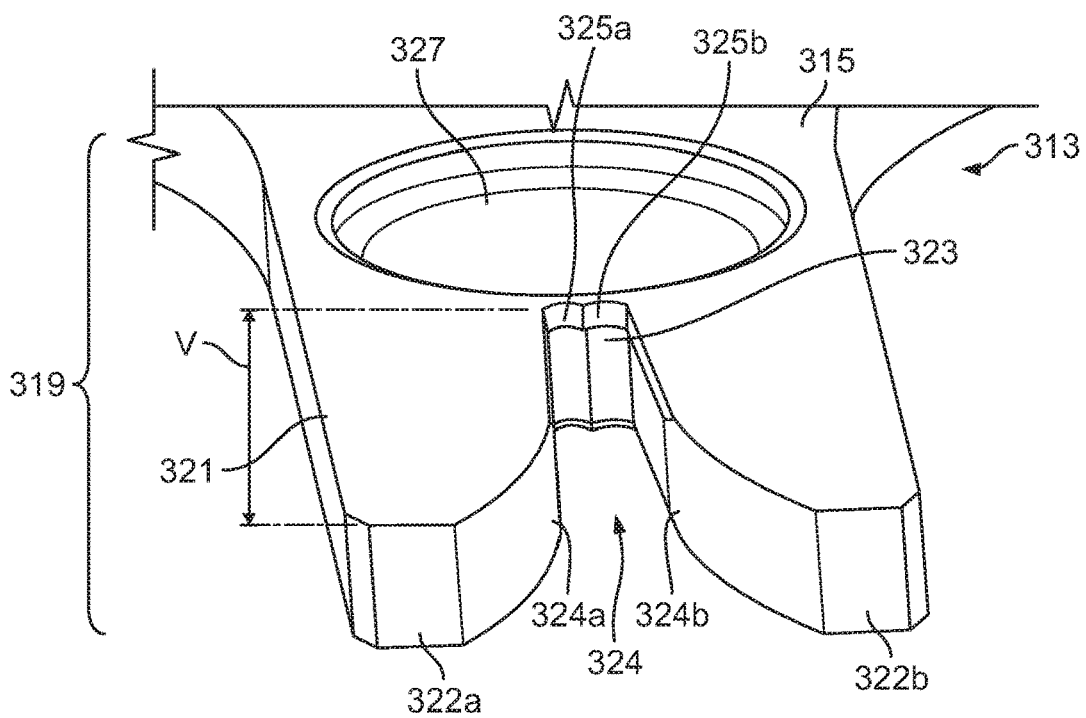
FIG. 7 is a detailed perspective view of a contact area of the deformation unit of FIG. 6.

A deformation unit 313, shown in FIGS. 6 and 7, is configured for, amongst other things, the devices 10, 100, 200 described above.

The deformation unit 313, as shown in FIGS. 6 and 7, has a punch 315 which may be displaced so as to press on an electrical connector 101 and a connection device, such as those described in the preceding embodiments, in order to plastically deform the wings of the connection device around the electrical conductor when the device 10, 100, 200 is used. The punch 315 is configured such that an electrical current is capable of passing through it. A first part 317 of the punch 315 has several orifices 319a-c, which particularly make it possible to fix the deformation unit 313 onto another support. The punch 315 also has a second part 319, one end 321 of which is V-shaped with an opening 324 of depth V. The arms 322a, 322b of the V shape are joined at an area 323, called the contact area 323 of the deformation unit 313. The contact area 323 is configured to deform the wings of the connection device around the electrical conductor. The contact area 323 has a pair of grooves 325a, 325b.

The second part 319 of the punch 315 has a recess 327 depicted with a circular shape in FIGS. 6 and 7, but which could take any other shape. The recess 327 may have a thickness of 5 millimeters in particular. The use of such a recess 327 makes it possible to bring the hottest area closer to the contact area 323, which is intended to be positioned facing the electrical contact area of an anvil of one of the devices 10, 100, 200 described previously.

The punch 315 is covered with an electrically insulating ceramic coating by physical vapor deposition, in particular of 12 micrometers thickness, with the exception at least of the contact area 323 and of the inner walls 324a, 324b opposite the arms 322a, 322b of the second part 319. The insulating coating by physical vapor deposition thus makes it possible to better localize the passage of the electrical current in the deformation unit 313 and thus to improve the effectiveness of the device 10, 100, 200 by increasing the temperature and by localizing the heat in the soldering area.

What is claimed is:

1. A device for soldering an electrical conductor with a connection device, comprising:

a base plate having a passageway; and an anvil mounted on the base plate and at least partially housed in the passageway, the anvil electrically insulated from the base plate and positioned to allow an electrical current to pass through at least one of the electrical conductor and the connection device.

2. The device of claim 1, wherein the anvil is fixed to the base plate by an electrically insulating glue.

3. The device of claim 2, wherein the anvil has a first portion and a second portion, the first portion is housed in the passageway of the base plate and the second portion has an electrical contact area on a top of the anvil on which the electrical conductor and the connection device are positioned.

4. The device of claim 3, wherein the first portion and the second portion are distinct from each other.

5. The device of claim 3, wherein the first portion and the second portion are integrally formed in a single piece.

6. The device of claim 3, wherein the first portion has a shape complementary to the passageway, the first portion is retained in the passageway by a form-fit in a direction of insertion of the first portion into the passageway.

7. The device of claim 6, wherein the first portion and/or the passageway has a beveled or a tapered shape.

8. The device of claim 3, wherein the anvil is made of a conductive material and a lateral face of the first portion housed in the passageway is covered with an insulating coating.

9. The device of claim 8, wherein the conductive material is steel and the insulating coating is a ceramic.

10. The device of claim 3, wherein the passageway opens out on a first surface of the base plate and a second surface of the base plate, the passageway has a shoulder on a side of the base plate that forms a gluing groove with the first portion, the gluing groove at least partially filled with the electrically insulating glue.

11. The device of claim 10, wherein a depth of the passageway is greater than a height of the first portion and the first portion is positioned with an indent from the first surface and the second surface of the base plate.

12. The device of claim 3, wherein the first portion and the second portion are joined by a fixing screw.

* * * * *